(12) United States Patent
Harrison et al.

(10) Patent No.: US 7,051,285 B1
(45) Date of Patent: May 23, 2006

(54) CONTROLLING THE DISPLAY OF PUP-UP WEB BROWSER WINDOWS

(75) Inventors: Edward R. Harrison, Beaverton, OR (US); Alyson R. Miller, Portland, OR (US); James W. Lundell, Portland, OR (US); Cindy L. Merrill, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1060 days.

(21) Appl. No.: 09/605,275

(22) Filed: Jun. 28, 2000

(51) Int. Cl.
*G09G 5/00* (2006.01)

(52) U.S. Cl. .......................................... 715/760; 808/809
(58) Field of Classification Search ................. 345/760, 345/808, 705, 809, 810
See application file for complete search history.

(56) References Cited

U.S. PATENT DOCUMENTS 5,742,768 A * 4/1998 Gennaro et al. ................... 1/1
6,363,419 B1 * 3/2002 Martin et al. ................ 709/219
6,373,502 B1 * 4/2002 Nielsen ........................ 345/708
6,442,529 B1 * 8/2002 Krishan et al. ................ 705/14

OTHER PUBLICATIONS

"Introduction to Pop–up Window", www.webreview.com/1998/11_06/webauthors/11_06_98_2.shtml, Nov. 6, 1998 Issue.*
"Introduction to Pop–up Window", www.webreview.com/1998/11_06/webauthors/11_06_98_2.shtml, Nov. 6, 1998 Issue.*
"HTML 4.0 Specification", W3C, www.w3.org/TR/1998/REC–html40–19980424, Apr. 24th 1998.*

* cited by examiner

*Primary Examiner*—Kristine Kincaid
*Assistant Examiner*—Thanh Vu
(74) *Attorney, Agent, or Firm*—Trop, Pruner & Hu, P.C.

(57) ABSTRACT

A system for controlling the display of pop-up windows in web browsers intercepts a request to display a pop-up window and instead may display a dialog box asking the user to indicate whether the user wishes to display the pop-up window. The dialog box may extract information from the pop-up window to give the user some indication of what the pop-up window is about. The user may then control whether the pop-up window is displayed or not.

7 Claims, 4 Drawing Sheets

CONTROLLING THE DISPLAY OF PUP-UP WEB BROWSER WINDOWS

BACKGROUND

This invention relates generally to web browsers for displaying web pages, for example in connection with the Internet.

Internet web browsers are software that allow web pages to be displayed on a computer monitor or other display device. Web pages are typically standalone pages that the user can scroll and interact with. In some cases, web pages have secondary pop-up windows that appear simultaneously with the original web page. A pop-up window may appear under the control of web page software when an option is selected using a mouse button. The pop-up window typically remains visible until the mouse button is released. Pop-up windows may be used for such things as advertising, additional information about a web page, navigation or surveys, as a few examples.

Generally web browsers handle these pop-up windows by creating a separate web browser window in which the pop-up window is displayed. In Microsoft® Windows®, for example, each separate browser has an entry in the task bar, indicating to the user that each entry corresponds to a completely separate and controllable browser.

In some cases, a web browser only runs in one window. For example, the web browser or parts thereof may be embodied in hardware. When the web browser is embodied in hardware in devices such as Internet terminals, handheld Internet tablets and other appliance-like devices, the ability to create independent browser windows may be limited due to limitations in the operating system of the device.

Alternatively, some devices may be designed for ease of use. In such cases it may be desirable to reduce the complexity of the user interface by making a decision to use only one window even if the underlying operating system can support multiple windows.

In the situation where only one browser window may be displayed at a time, a problem arises with respect to how to handle the issue of pop-up windows. The pop-up window may simply be ignored and not presented to the user. This may be undesirable because the pop-up window may contain information that is important.

In multiple browser window situations, the pop-up window may be displayed in a second browser window. But this makes the user interface much more complex because a mechanism must be provided to switch between the browser windows and to dismiss unneeded browser windows. In other words, the user interface looks and feels like a windows interface and this may be at odds with the desire to create simple devices.

Thus, for a number of reasons, it would be desirable to have a way of controlling the display of pop-up windows in a browser that facilitates the operation of the computer system without unnecessarily annoying the user.

DETAILED DESCRIPTION

Figure 1:
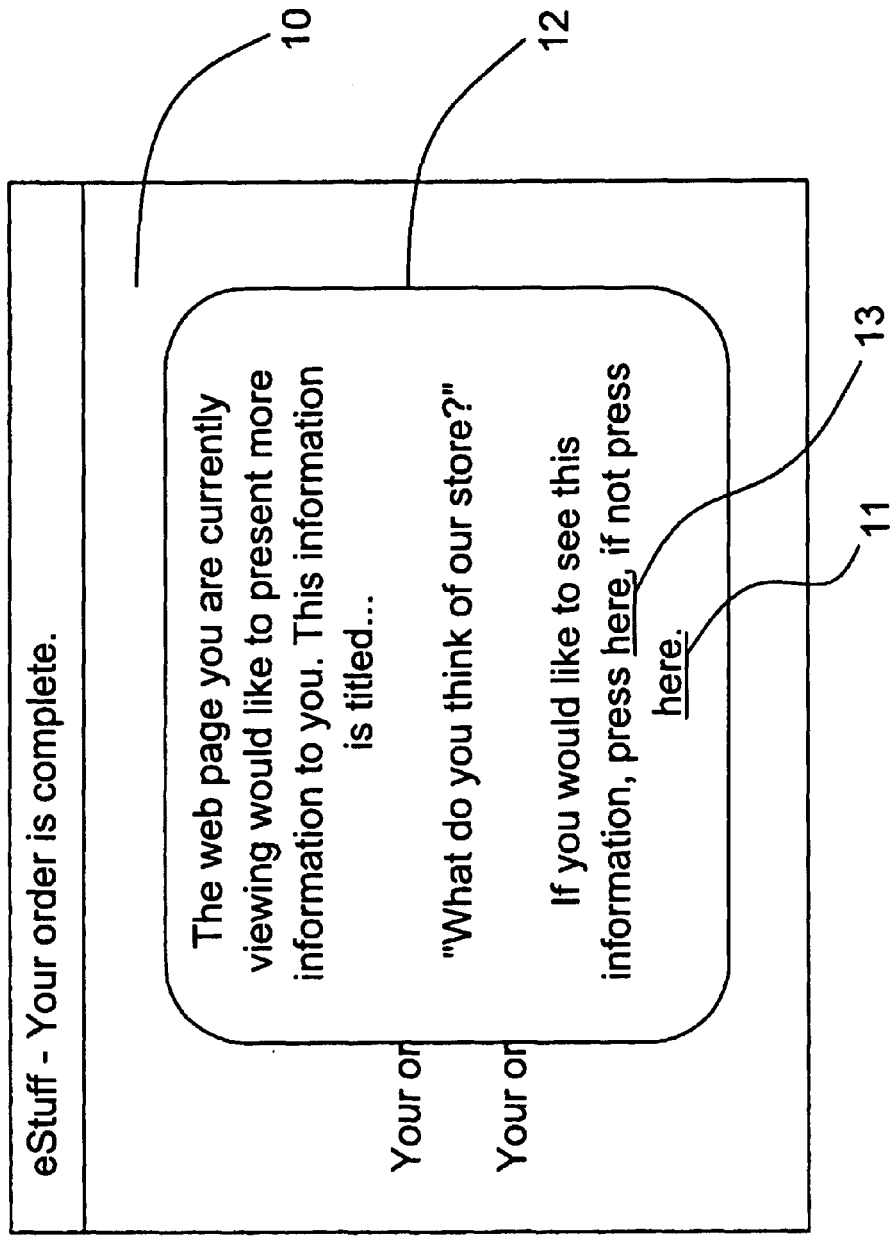
FIG. 1 is a depiction of a graphical user interface in accordance with one embodiment of the present invention.

Referring to FIG. 1, a graphical user interface 10 is illustrated in an example in which a customer has placed an order over the Internet. For example, a user may use a processor-based system at the user's location to access over the Internet a web page associated with a service or product provider. The web page may contain software, such as JavaScript, that, upon the occurrence of a given event, causes a pop-up window to automatically be displayed through the user's browser.

With embodiments of the present invention, a request from the web page server to a client web browser to create the pop-up window is intercepted by software resident on the client system. Instead, the client system may display a dialog box 12 that requests the user to indicate whether or not the user wants to see the pop-up window.

Figure 2:
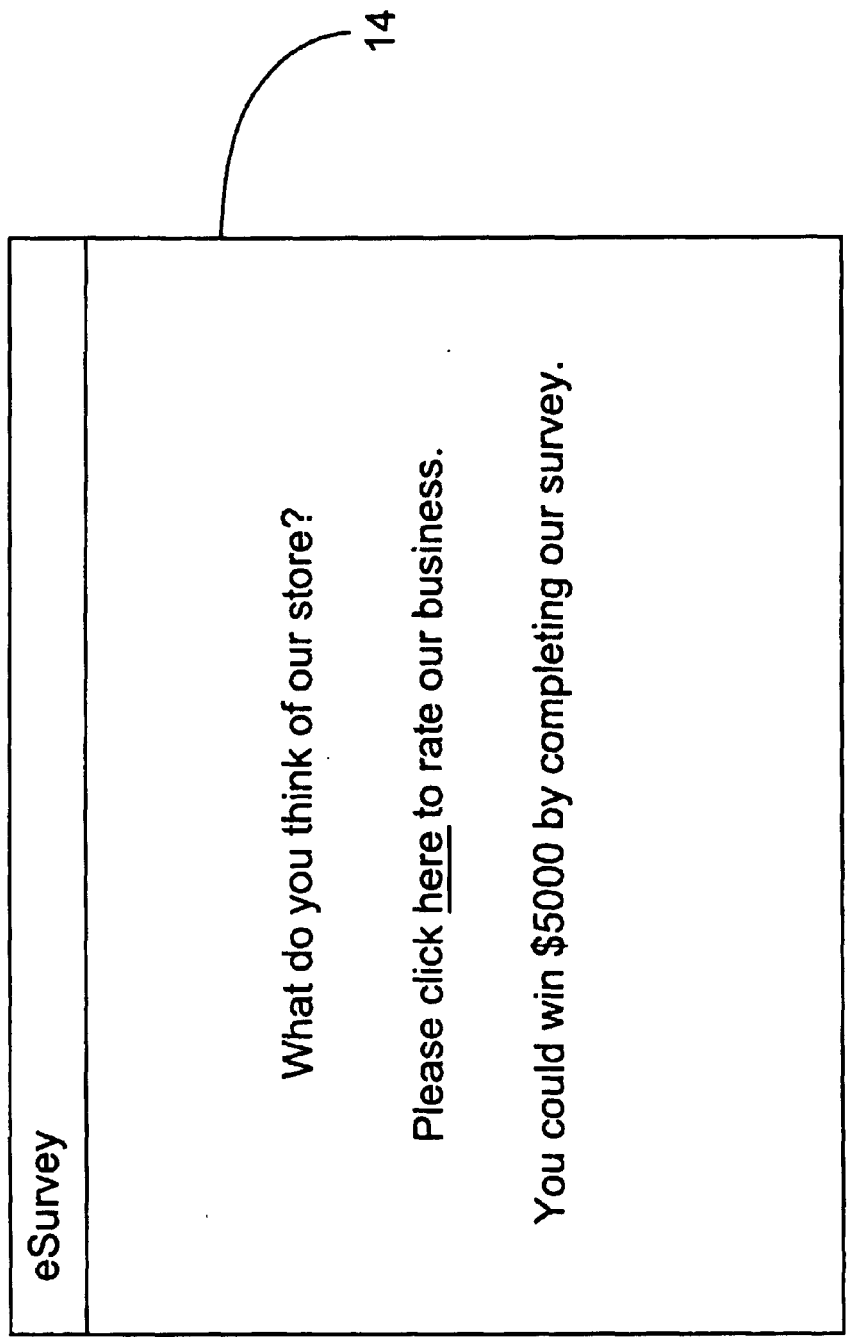
FIG. 2 is another graphical user interface in accordance with one embodiment of the present invention.

Thus, the dialog box 12 asks whether the user would like to see the pop-up window that the web page would like to present to the user. The dialog box 12 may automatically extract or parse information from the pop-up window to give some information about the nature of the pop-up window, such as its title. The user is provided a graphical user interface with icons 11 and 13 to indicate whether the user wants to see the pop-up window. If the user selects the icon 13 to see the pop-up window, a graphical user interface 14, shown in FIG. 2, may appear. In this example, the user is asked, through the interface 14, a survey question about the on-line service or business provider.

Of course, pop-up windows may be offered to the user for a myriad of purposes, including advertising, providing a web site navigation mechanism, providing a help mechanism, providing additional information, or the like. Similarly, the user can be queried about whether the user is interested in seeing the pop-up window using mechanisms other than a dialog box.

Figure 3:
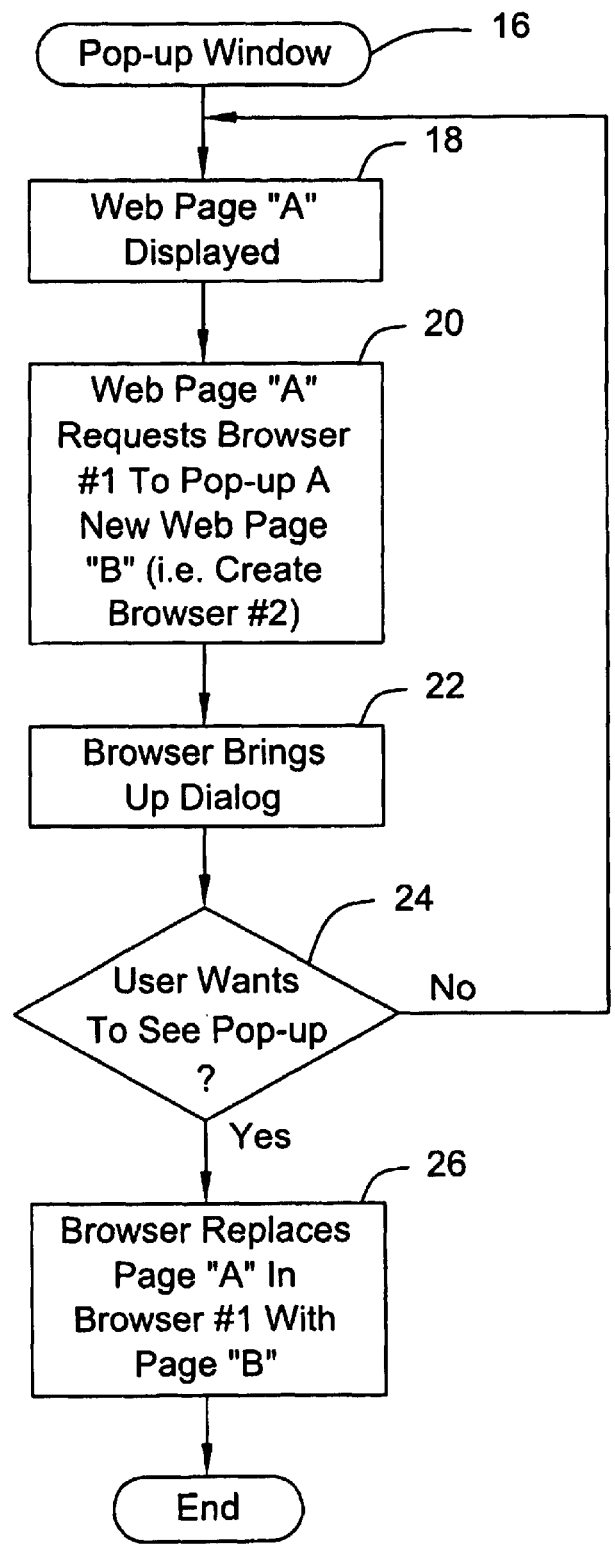
FIG. 3 is a flow chart for software in accordance with one embodiment of the present invention.

Referring to FIG. 3, software 16, in one embodiment, for controlling the display of pop-up windows in web browsers begins by displaying a first web page as indicated in block 18. When the displayed web page requests the client's browser to display a pop-up window, as indicated in block 20, the client browser automatically brings up a dialog box as indicated in block 22. The user is asked through the dialog box to indicate whether or not the user wants to see the pop-up window. At diamond 24, a determination is made as to which display option the user selected. If the user indicates that the user does not want to see the pop-up window, the flow iterates. Otherwise, the pop-up window replaces the currently displayed page in one embodiment of the present invention (block 26).

Embodiment of the present invention may be utilized in a variety of diverse applications. Embodiments may be utilized for example in connection with desktop, laptop and handheld computers. Similarly, embodiments may be utilized in connection with embedded systems such as Internet appliances including Internet tablets, Internet terminals and a variety of other appliance-like devices.

An embedded system is used for a limited purpose. The embedded system does not have an open operating system. The embedded system does not accept plug-ins. The embedded system may have limited processor power, limited memory and limited display screen area. In some cases, the operating systems of embedded systems are not adapted to display separate browser windows in many cases, even if they can display dialog boxes.

Embodiments of the present invention may achieve a number of important advantages including providing a simpler interface that avoids switching between browser interfaces. Embodiments may also avoid the typical windows interface. In addition, in systems in which only one browser is available, the present invention, in some embodiments, provides an advantageous way to deal with the possibility of multiple browser windows.

Figure 4:
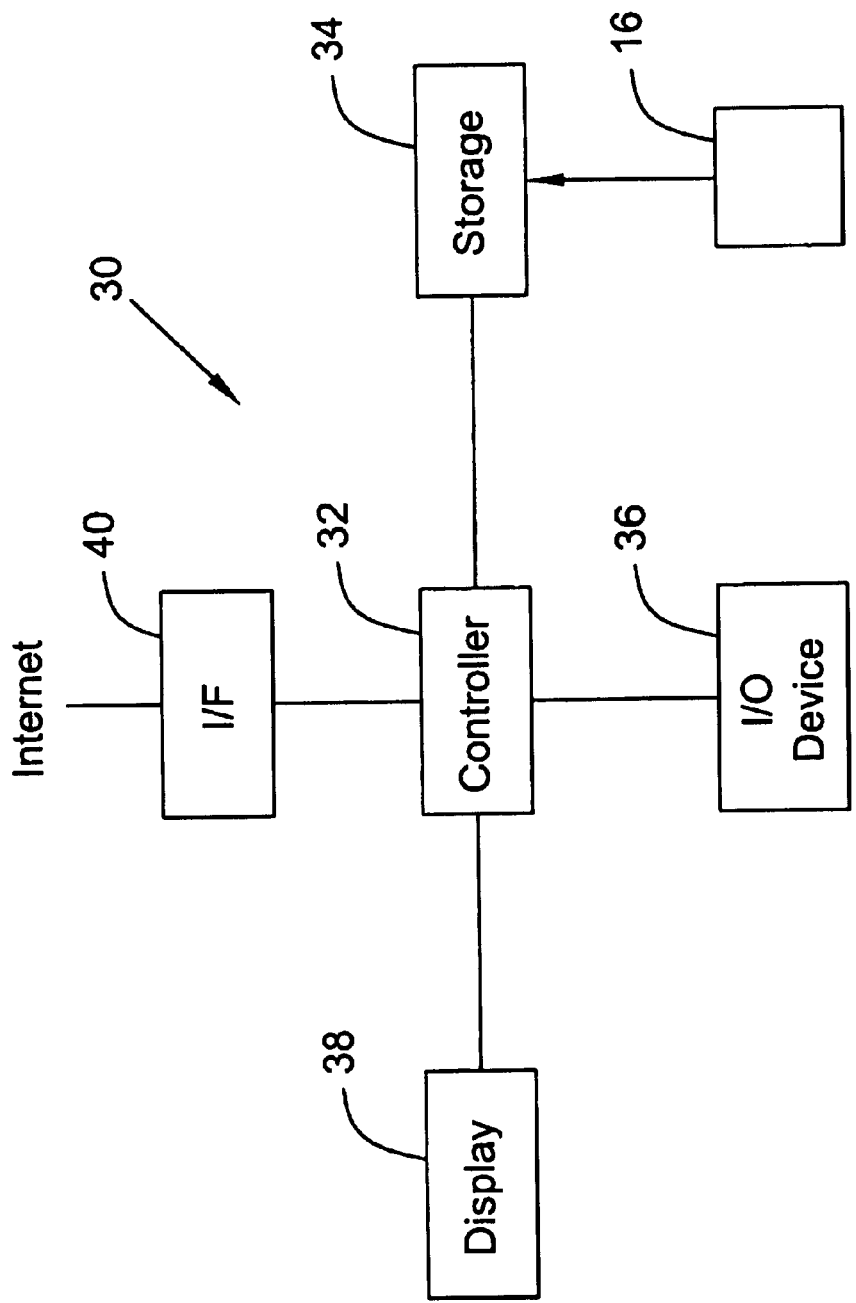
FIG. 4 is a block diagram for hardware for one embodiment of the present invention.

Referring to FIG. 4, in accordance with one embodiment of the present invention, an embedded system 30, such as Internet appliance 30, may include a controller 32 that may be a processor, as one example, coupled to a display 38. The display 38 may be for example, a computer monitor, a television receiver or a liquid crystal display, for example as used in an Internet tablet. The display 38 may be coupled to the rest of the system 30 by a wireless link such as a radio link. The controller 32 may also be coupled to an input/output device 36 that allows the user to indicate whether the user wants to see the pop-up window or not. The input/output device 36 may be a touch screen, a mouse, a keypad or a keyboard as examples. The controller 32 may also be coupled to an interface 40 such as a modem that enables an Internet connection. Finally, the controller 32 is coupled to storage 34 that may store the browser as well as the software 16 shown in FIG. 3.

Instead of displaying the dialog box 12, a web page with the same content may be displayed. The web page that replaces the dialog box 12 may be displayed full screen.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:

displaying a web page;

receiving a request from said web page to display a pop-up window; and in response to said request, displaying information without displaying said pop-up window.

2. The method of claim 1 further including displaying a graphical user interface asking a user to indicate whether the user wants to display the pop-up window.

3. An article comprising a medium storing instructions that enable a processor-based system to:

display a web page;

receive a request from the web page to display a pop-up window; and in response to said request, display information without displaying said pop-up window.

4. The article of claim 3 further storing instructions that enable the processor-based system to display a graphical user interface asking a user to indicate whether the user wants to display the pop-up window.

5. The article of claim 4 further storing instructions that enable the processor-based system to intercept the request to display the pop-up window and take other action instead.

6. A system comprising:

a processor-based device; and a storage coupled to said processor-based device storing instructions that enable the system to display a web page, receive a request from the web page to display a pop-up window, and in response to said request, display information without displaying said pop-up window.

7. The system of claim 6 wherein said storage further stores instructions that enable the processor-based system to display a graphical user interface asking the user to indicate whether the user wants to display the pop-up window.

* * * * *

UNITED STATES PATENT AND TRADEMARK OFFICE
CERTIFICATE OF CORRECTION

| | | |
|---|---|---|
| PATENT NO. | : 7,051,285 B1 | |
| APPLICATION NO. | : 09/605275 | |
| DATED | : May 23, 2006 | |
| INVENTOR(S) | : Edward R. Harrison et al. | |

It is certified that error appears in the above-identified patent and that said Letters Patent is hereby corrected as shown below:

<u>Column 4, Line 37 - 52:</u>
Insert the following:

--8. A method comprising:
 receiving a request for a browser pop-up window;
 in response to said request, displaying a graphical user interface asking a user to indicate whether the user wants to display the pop-up window; and
 extracting information from the pop-up window in order to provide information to the user about the pop-up window.

9. The method of claim 8 wherein displaying the graphical user interface includes displaying a dialog box.

10. The method of claim 8 wherein displaying the graphical user interface includes displaying a web page.

11. An article comprising a medium storing instructions that enable a processor-based system to:
 receive a request for a browser pop-up window;
 in response to said request, display a graphical user interface asking a user to indicate whether the user wants to display the pop-up window; and
 extract information from the pop-up window in order to provide information to the user about the pop-up window.

12. The article of claim 11 further storing instructions that enable the processor-based system to display a dialog box.

13. A system comprising:
 a processor-based device;
 a storage coupled to said processor-based device storing instructions that enable the system to receive a request for a browser pop-up window, in response to said request, display a graphical user interface asking a user to indicate whether the user wants to display the pop-up window, and extract information from the pop-up window in order to provide information to the user about the pop-up window.

UNITED STATES PATENT AND TRADEMARK OFFICE
CERTIFICATE OF CORRECTION

| | | |
|---|---|---|
| PATENT NO. | : 7,051,285 B1 | Page 2 of 2 |
| APPLICATION NO. | : 09/605275 | |
| DATED | : May 23, 2006 | |
| INVENTOR(S) | : Edward R. Harrison et al. | |

It is certified that error appears in the above-identified patent and that said Letters Patent is hereby corrected as shown below:

14.     The system of claim 13 wherein said storage stores instructions that enable the system to display a dialog box.--

Signed and Sealed this

Nineteenth Day of December, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,051,285 B1 | Page 1 of 1 |
| APPLICATION NO. | : 09/605275 | |
| DATED | : May 23, 2006 | |
| INVENTOR(S) | : Edward R. Harrison et al. | |

It is certified that error appears in the above-identified patent and that said Letters Patent is hereby corrected as shown below:

Title Page

Item [54] "CONTROLLING THE DISPLAY OF PUP-UP WEB BROWSER WINDOWS" should be --CONTROLLING THE DISPLAY OF POP-UP WEB BROWSER WINDOWS--.

Signed and Sealed this
Twenty-first Day of February, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,051,285 B1 | Page 1 of 1 |
| APPLICATION NO. | : 09/605275 | |
| DATED | : May 23, 2006 | |
| INVENTOR(S) | : Edward R. Harrison et al. | |

It is certified that error appears in the above-identified patent and that said Letters Patent is hereby corrected as shown below:

Title Page, Item (54) and at Column 1, lines 1 and 2, Title

"CONTROLLING THE DISPLAY OF PUP-UP WEB BROWSER WINDOWS" should be
--CONTROLLING THE DISPLAY OF POP-UP WEB BROWSER WINDOWS--.

This certificate supersedes the Certificate of Correction issued February 21, 2012.

Signed and Sealed this
Twentieth Day of March, 2012

David J. Kappos
*Director of the United States Patent and Trademark Office*